United States Patent [19]

Hu et al.

[11] Patent Number: 5,228,631
[45] Date of Patent: Jul. 20, 1993

[54] APPARATUS FOR WINDING A SPOOL COMPOSED OF A PLURALITY OF FLAT COILS FORMED FROM A SINGLE FILAMENT

[75] Inventors: William C. Hu, Chatsworth; Hui-Pin Hsu, Northridge, both of Calif.

[73] Assignee: Hughes Aircraft Company, Los Angeles, Calif.

[21] Appl. No.: 887,964

[22] Filed: May 26, 1992

[51] Int. Cl.⁵ .................... B65H 54/00; B65H 55/00
[52] U.S. Cl. ........................................ 242/47; 242/1; 242/53; 242/159; 242/167; 242/173
[58] Field of Search ............... 242/47, 53, 54 R, 1, 242/159, 166, 167, 172, 173; 206/389, 390, 391, 392, 393, 394

[56] References Cited

U.S. PATENT DOCUMENTS

| | | | |
|---|---|---|---|
| 3,089,588 | 5/1963 | Correll | 242/159 X |
| 3,145,760 | 8/1964 | Brautigam | 242/159 X |
| 3,785,587 | 1/1974 | Meyfarth et al. | 242/159 |
| 4,593,815 | 6/1986 | Wright | 242/159 |

FOREIGN PATENT DOCUMENTS

WO9005928 5/1990 PCT Int'l Appl. .
P8903726 11/1989 Spain .

Primary Examiner—Stanley N. Gilreath
Attorney, Agent, or Firm—Charles D. Brown; W. K. Denson-Low

[57] ABSTRACT

A continuous filament (40) from a supply spool (50) is wound onto a takeup spool (52) in an amount to form one flat coil (54). A first winding device (42) forms a first flat coil (54) in winding space (36) between guides (28 and 30) while simultaneously a second winding device (44) winds a second flat coil in winding space (38) between guides (30 and 32) from the filament on the takeup spool (52). On completion of the flat coil winding, the guide (32), second winding device (44) and takeup spool (52) are removed from the shaft assembly (34), adhesive is applied to the newly formed flat coils and the coils along with guides (28,30) are moved onto spindle (90) and against a flange (92). The guides (28,30) are removed from the shaft assembly (34) adjacent the newly wound coils stored against the flange (92) and remounted next to the winding device (42).

7 Claims, 6 Drawing Sheets

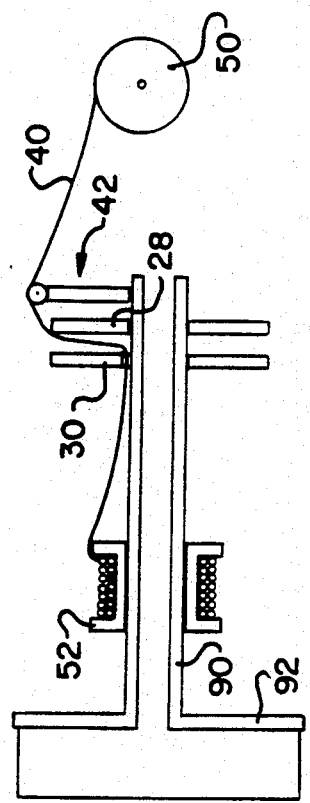
FIG.9
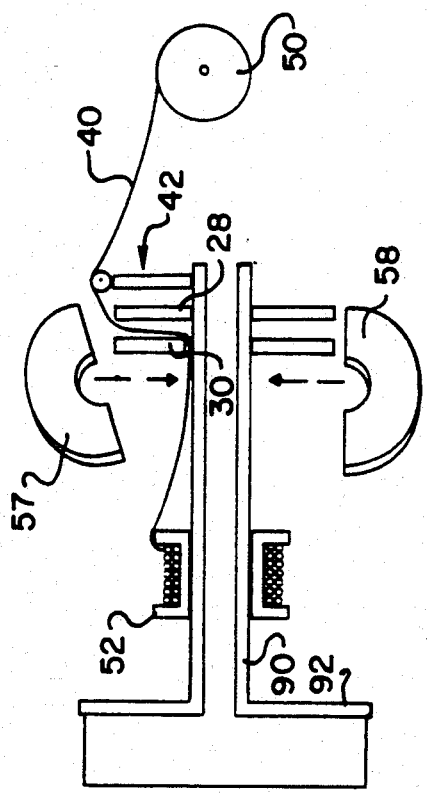
FIG.10
FIG.11
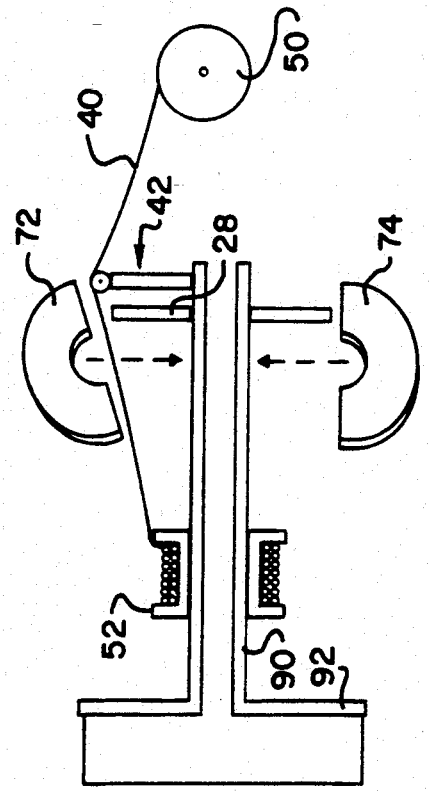
FIG.12

APPARATUS FOR WINDING A SPOOL COMPOSED OF A PLURALITY OF FLAT COILS FORMED FROM A SINGLE FILAMENT

This application is related to earlier filed application Ser. No. 07/271,476 filed Nov. 15, 1988 now abandoned.

BACKGROUND OF THE INVENTION

1. Field of the Invention

The present invention relates generally to the winding of filamentary materials onto a spool, and, more particularly, to a method and apparatus for the winding of filamentary materials into a tandem stack of flat coils from a single filament.

2. Description of Related Ar

There are many situations in which it is necessary to unwind from a prefabricated spool, an extended length of either a metal wire or an optical fiber at a rapid rate and in such a manner as not to crimp, distort or overstress the filamentary material. For example, certain present-day missiles include a stored spool of a filament which, upon launching of the missile, is paid out and remains interconnected with apparatus at the launch site. The target scene information and missile guidance commands are transmitted via the filament data link for the entire or portion of the missile travel. Conventional cylindrical layered windings such as typically encountered in the winding of transformers or in the textile industry, for example, are not fully satisfactory for use with filaments such as optical fibers and may be accompanied by several difficulties in use. For example, on rapid payout of an optical fiber from a conventional spool which is cylindrically wound, there is a high lateral friction drag on the filament which produces heat with possible damage to the fiber from that source resulting in data link failure or undesirable signal modulation. Also, as the result of shelf storage or temperature cycling during storage, the winding pattern may collapse or slump which can prevent smooth payout on dispense posing a risk of damage. Still further, there is an inherent requirement in cylindrical layered winding of fiber crossover areas between the layers, and this produces what is referred to as "microbending" resulting in significant optical signal loss.

In an attempt to overcome the deficiencies of cylindrical layered windings, spools have been made up by winding a tandem stack of flat coils, each coil consisting of a fixed length of fiber wound into a spiral. Although this approach overcomes the noted difficulties with cylindrical layered winding, until now a practical and high-speed process of making flat coil windings from a single continuous fiber has not been achieved with previous known techniques all found to be excessively labor intensive and tedious.

SUMMARY OF THE INVENTION

It is a primary object and aim of the present invention to provide a method and apparatus for winding a spool composed of a plurality of flat coils all formed from a single unbroken filament.

A further object is the provision of method and apparatus for simultaneously winding a pair of flat coils from a single filament.

A two-coil winding apparatus for practicing the method of this invention is constructed of three spaced apart, parallel guide plates mounted onto a shaft defining first and second winding spaces, each winding space being of a width enabling only a single filament to be wound therein. A length of filament pulled off a supply spool equal to one flat coil length is temporarily stored on a takeup spool with an intermediate portion of the filament length passing through the two winding spaces and an axially located opening in the central guide plate. Two filament winding devices respectively wind one flat coil in the first winding space from the temporarily stored filament length, and another flat coil in the second winding space taken from filament on the main supply spool. The two flat coils are simultaneously wound in opposite directions and are connected via the intermediate filament portion passing through the central guide plate opening.

After the two flat coils are wound, the temporary spool (now empty) is removed and a light coat of adhesive is applied to the coils for maintaining geometric and dimensional integrity. Preferably, the adhesive is sprayed through access slots or cut-outs in the two outer guide plates directly to the coils prior to dismantling of the guide plates from the coils.

The completed pair of flat coils are slid to one end of a storage shaft, and a further pair of coils may be wound in the manner just described. This process is continued until the required number of flat coils are obtained to form a desired spool.

DESCRIPTION OF THE DRAWINGS

In the accompanying drawings:

FIGS. 9 through 17 depict in schematic form the various steps in the method of the invention for producing a pair of flat coils.

DESCRIPTION OF A PREFERRED EMBODIMENT

As already alluded to, there are a number of situations in which an optical fiber or a metal wire must be paid out very rapidly from a spool upon which it is wound in a manner that will not unduly stress or break the filament. For example, in certain missiles a filament interconnects the missile with launch terminal apparatus, which may be aboard a ship, an aircraft or ground based. When the missile is fired, a continuous signal data link is provided by the filament which is allowed to pay out from a spool the missile, at the launch site, or both. In this manner, target tracking and guidance computation can be accomplished at the launch terminal and command instructions given over the filament to the missile guidance and control equipment thereby obviating the necessity for including all the complex computing and tracking equipment on board the missile.

Although the described method of winding and apparatus for practicing the method are useful for winding virtually any kind of filamentary material, they are especially advantageous when applied to winding optical fibers and will be described particularly in that connection here.

To avoid the disadvantages of conventional cylindrical layered coils, it is a fundamental feature of the present invention to form a wound spool of given length by winding an optical fiber in a flat-coil configuration, or, more precisely, winding a series of flat coils all from a single continuous fiber. A "flat coil" as used here consists essentially of winding each fiber loop on top of a previous loop, forming a disk-like coil that is one fiber diameter thick. In the past, such a flat coil has been made by hand laying the fiber on a horizontal surface. However, when a plurality of flat coils are required there is no known efficient method and apparatus for achieving flat-coil windings with acceptable speed.

Figure 1:
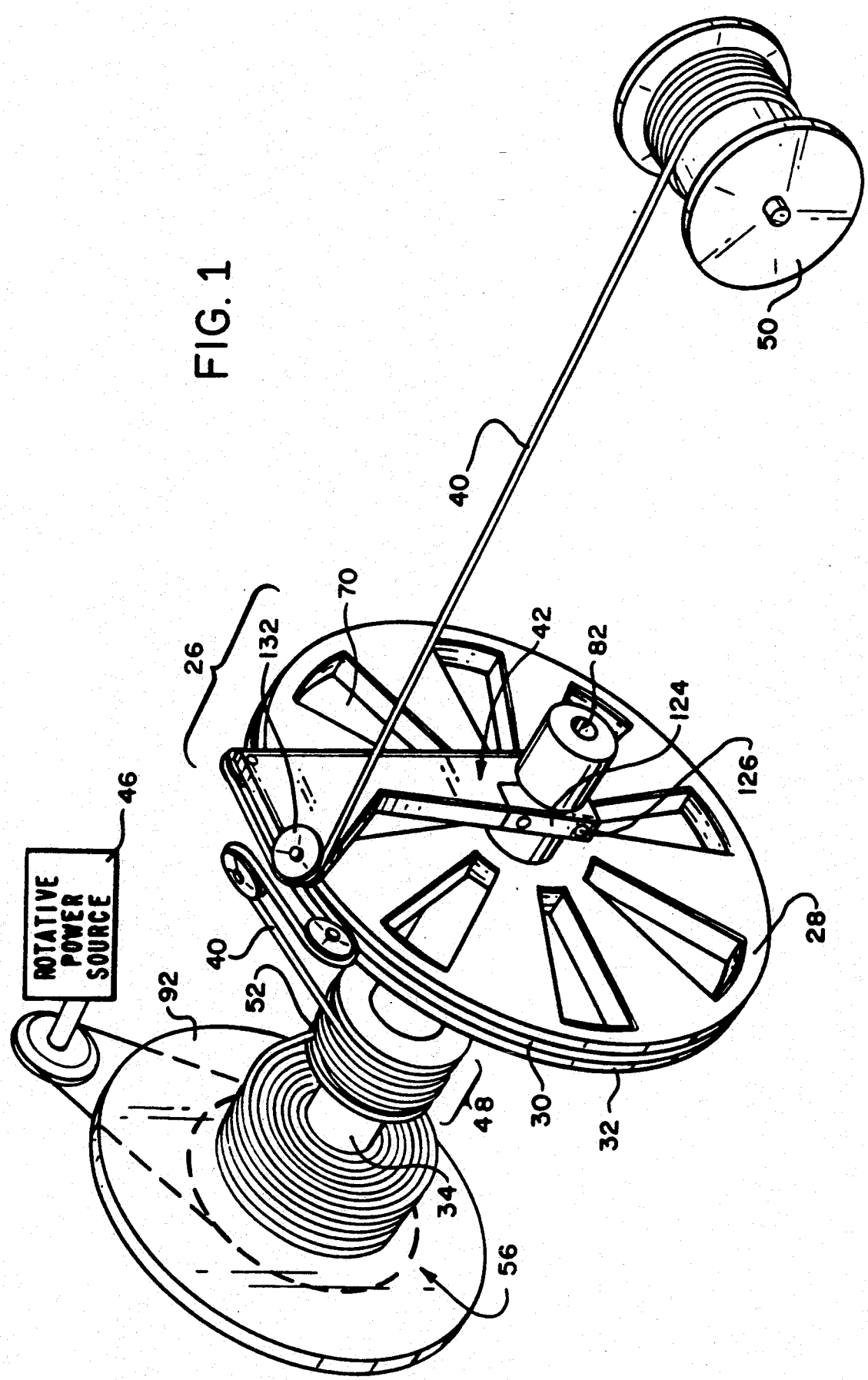
FIG. 1 is a perspective view of apparatus for practicing the method of this invention.
Figure 3:
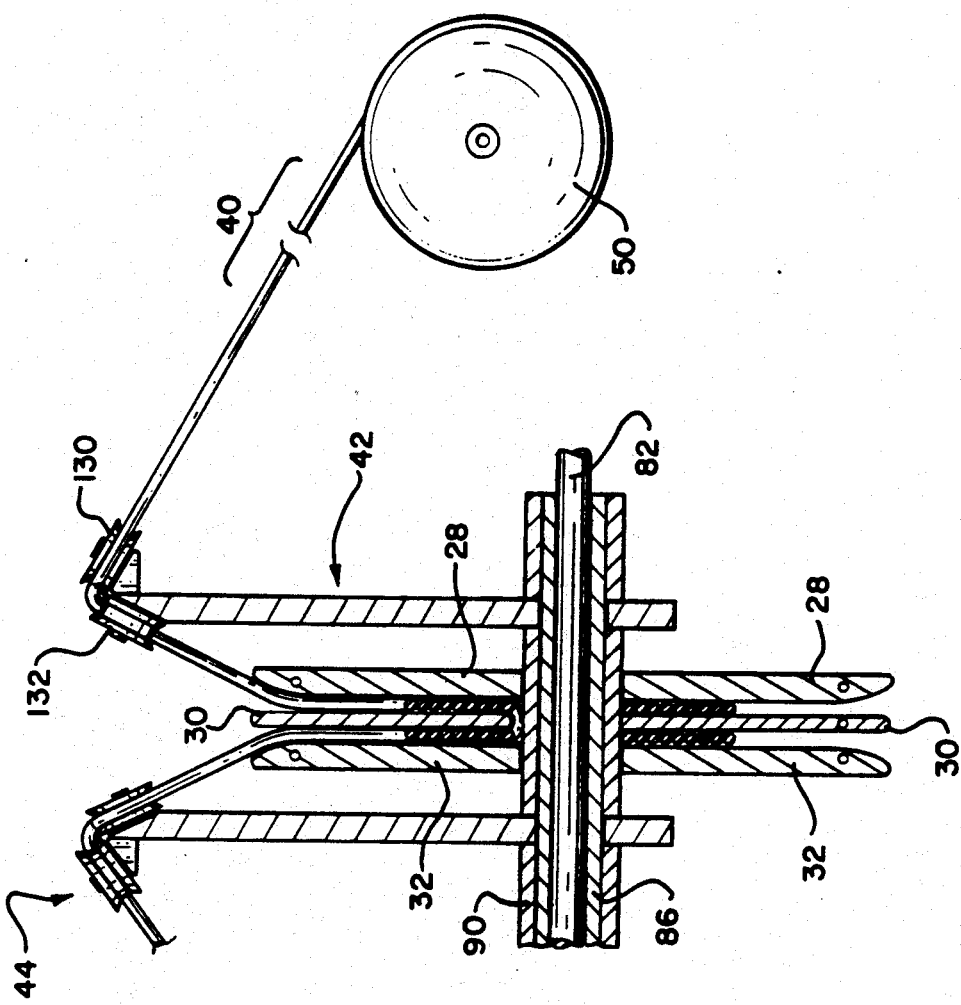
FIG. 3 is a side elevational, sectional view taken through filament winding devices and guide plates defining a pair of flat coil winding spaces.
Figure 2:
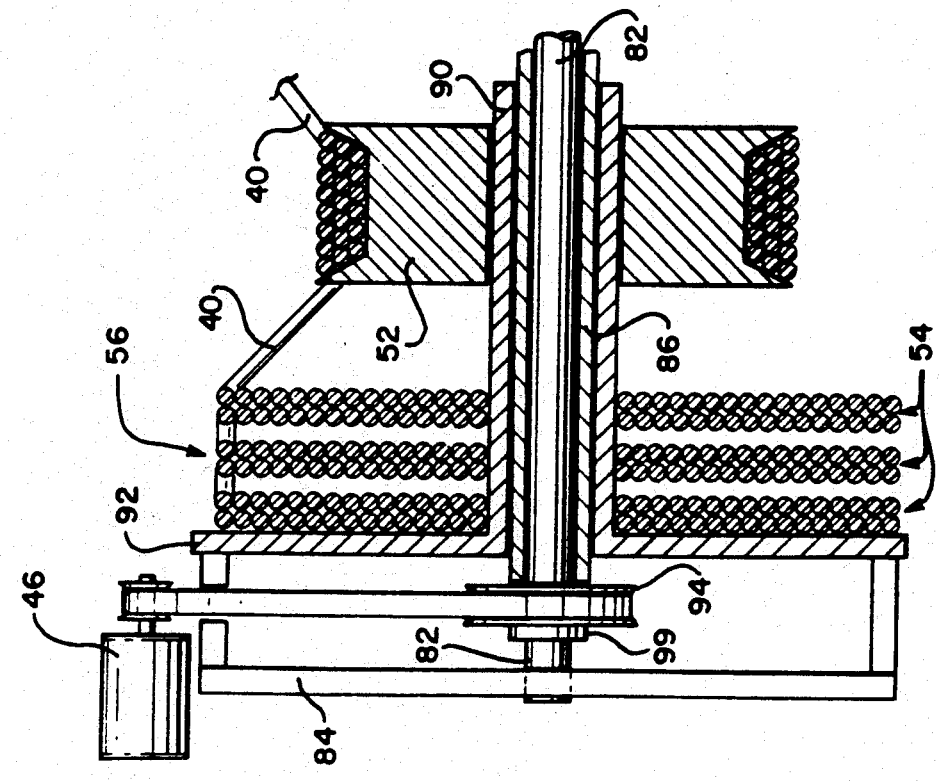
FIG. 2 is a side elevational sectional view taken through a number of pairs of flat coils and a temporary takeup spool.

For the ensuing description of the major aspects of the method and apparatus of this invention, reference is made to FIGS. 1 and 2. The coil forming apparatus identified generally as 26 includes in its main parts three winding guide plates 28, 30 and 32, located on a common shaft assembly 34 and separated so as to form two winding spaces 36 and 38, each of the spaces being only very slightly wider than the diameter of an optical fiber 40 to be used in forming the spool. First and second fiber winding devices 42 and 44 mounted onto the shaft assembly 34 are driven, in a manner to be more particularly described, by a rotative power source 46 (e.g., electric motor) to respectively wind separate flat coils in each of the winding spaces 36 and 38.

An initial preparatory step in the method consists of unwinding a length 48 of fiber 40 from a supply spool 50 and temporarily storing the fiber length on a takeup spool 52. The length 48 of optical fiber is of a predetermined amount sufficient to form a single flat coil 54. Next, the fiber extending between the takeup spool and the supply spool is threaded through the winding device 42, placed within the space between the two outer guides 28 and 32 (the central guide 30 being removed). Finally, the guide 30 is assembled to the shaft assembly with the fiber passing through an enlargement of the guide axial opening.

It is a fundamental aspect of the invention that two flat coils 54 are wound simultaneously: one coil wound from the temporary storage spool 52 and the second wound directly from the fiber supply spool 50. More particularly, the two fiber winding devices 42 and 44 rotate in opposite directions to form a first flat coil in the space 36 between guide plates 28 and 30 and a second flat coil in space 38 between guide plates 30 and 32, respectively. Upon completion of the fabrication of the two adjacent flat coils, they are sprayed or otherwise provided with adhesive to maintain coil integrity. Next, the temporary takeup spool 52, the winding device 44 and guide plate 32 are disassembled from the shaft assembly 34 and the two finished flat coils along with guide plates 28 and 30 are then slid along the shaft assembly to a storage position 56 where the coils are stored in side-by-side relation. The two guide plates 28 and 30 are then disassembled leaving just the two flat coils at the storage position 56. Now, the takeup spool 52 and guide plates 30 and 32 can be reassembled onto the shaft assembly for further winding of flat coils.

Figure 8:
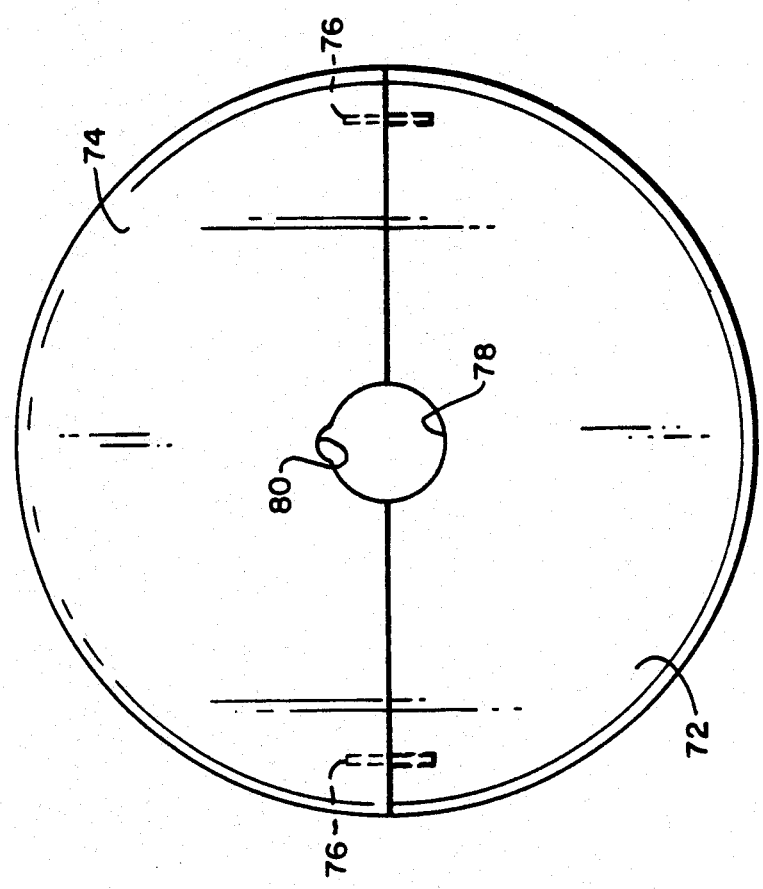
FIGS. 7 and 8 are elevational views of the winding space defining guide plates.
Figure 7:
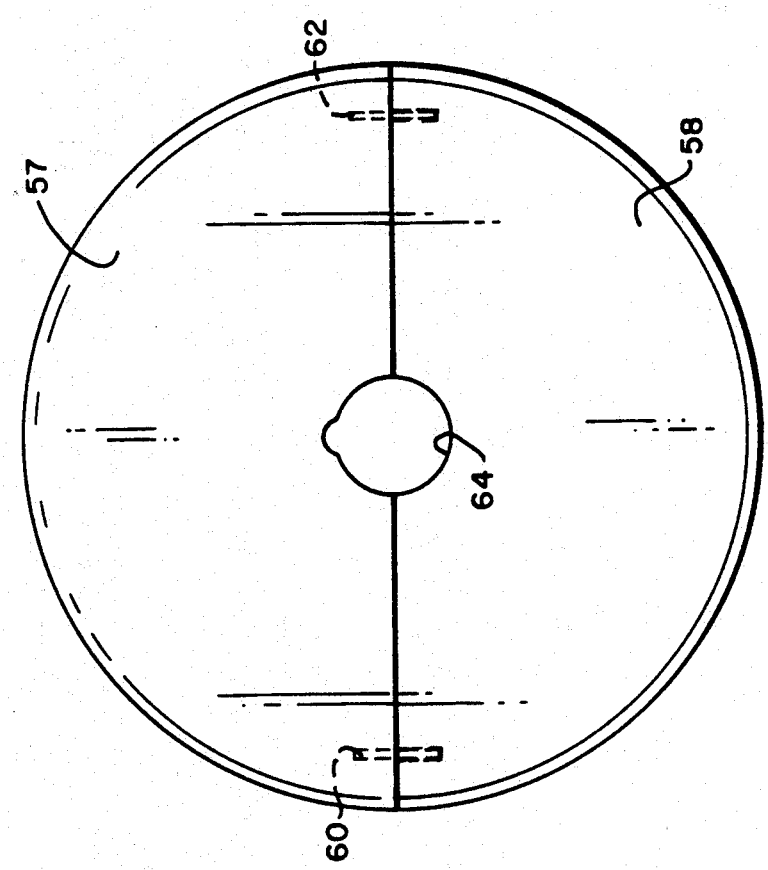

With particular reference now to FIGS. 2, 7 and 8, the winding framework defining each pair of flat coils 54 made by the invention includes the three generally circular guide plates 28, 30 and 32 which are arranged in parallel, facing, spaced apart relation and are unitarily secured to the shaft assembly 34. Each of the outer plates 28 and 32 are constructed of two semicircular parts, such as parts 57 and 58 for plate 28, which are releasably secured together along their straight edges by threaded members 60 and 62. An axial generally circular opening 64 is formed when the parts are fitted together on the shaft assembly 34 for the plate 28 and similarly for the plate 32. Radial slots in the guide plate 28, 32 allow application of adhesive upon completion of coil winding. The spacing between adjacent plates, namely 36 and 38, is such as to merely accommodate the width of a single fiber and yet is not so narrow as to cause the fiber to wedge between adjacent plates. A plurality of wedge-shaped openings 70 are formed in each plate to enable access to the flat coils for the application of adhesive as will be more particularly described.

It is to be noted that the marginal edge portions of the plates 28 and 32 are flared slightly outwardly, or away from each other, when they are fully assembled upon the shaft assembly. The purpose of this smooth flared marginal edge surface of the plates is to prevent injury to or stressing a fiber during the winding process as will be made more clear.

As can be seen best in FIG. 8, the central guide plate 30 is generally disc-like in shape and comprised of two separable parts 72 and 74 which are releasably joined along their common straight sides by the use of threaded means 76, for example. Similar to plates 28 and 32, two generally semi-circular openings on the respective parts 72 and 74 when joined form a substantially circular opening 78 that is slidingly received on the shaft means. In addition, the edge defining the circular opening 78 on one of the semi-circular parts (e.g., 72) bulges outwardly slightly from the circular path in order to provide an open space 81 when the plate 30 is mounted onto the shaft assembly via which a fiber can readily pass in an unstressed manner in a way that will be more particularly described.

For the following detailed description of the shaft assembly 34 reference is now made again to FIG. 2. As shown there, a rod core 82 has one end secured to an adjacent wall surface 84 and includes rotatably received thereon a hollow cylindrical axle 86 having on its opposite outer end (FIG. 4) a set of drive teeth 88. A hollow flat coil storage spindle 90 is slidingly received onto the cylindrical axle 86 and has a radially outwardly extending flange 92 at its outer end adjacent the wall surface 84. The flange is secured to the wall surface by a strut 93 to prevent movement or rotation of either the flange or the cylinder 90. The outer end of the cylinder 90 terminates at a point short of the teeth 88 on the axle 86.

Rotative power drive for the hollow cylindrical axis 86 is provided via a pulley 94 which is affixed to the outer end of the axle adjacent the wall surface 84 and a belt 98 with the power source being an electric motor 46, for example. A clamp ring 99 on the rod core 82 is secured to the rod just outwardly of the pulley 94 and serves to properly position and maintain the axle 86 against axial movement along the rod core.

Figure 4:
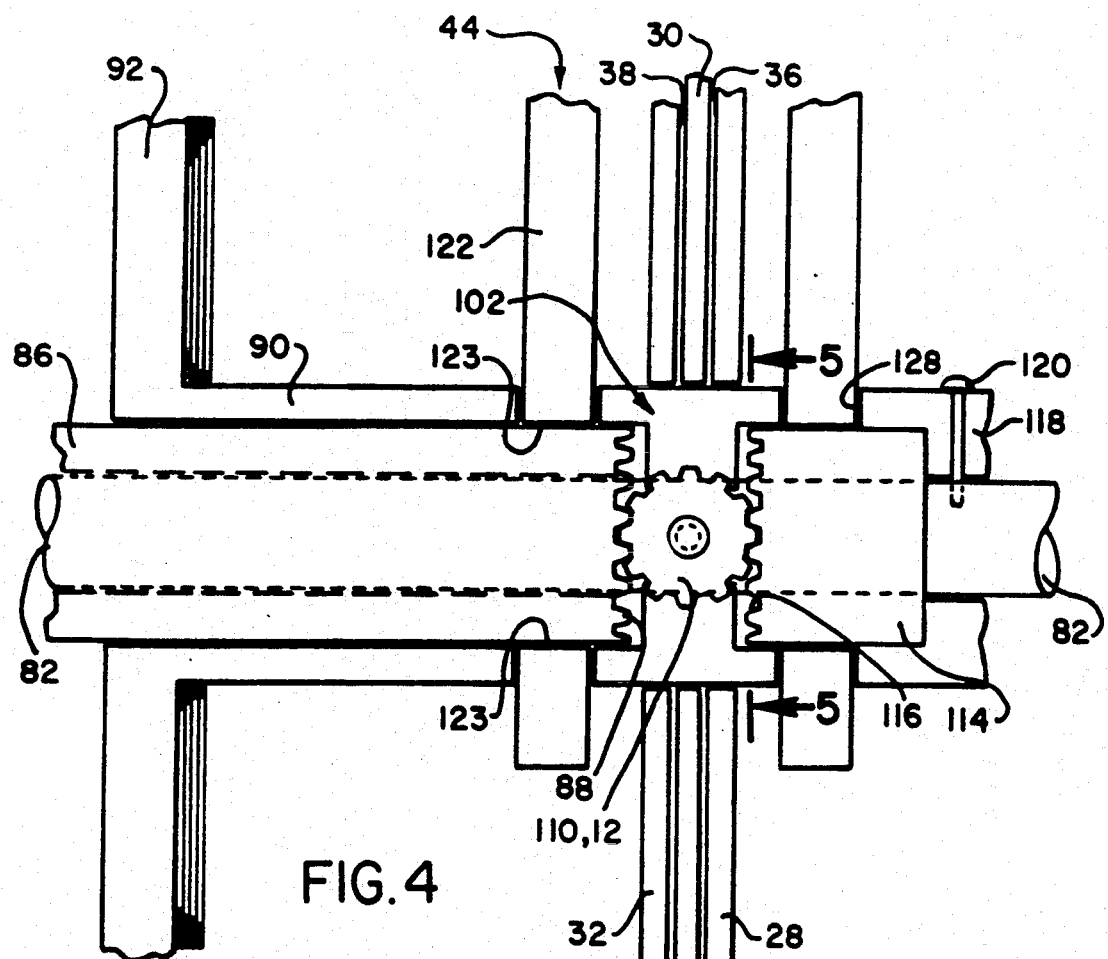
FIG. 4 is an elevational view of the winding device drive means.
Figure 5:
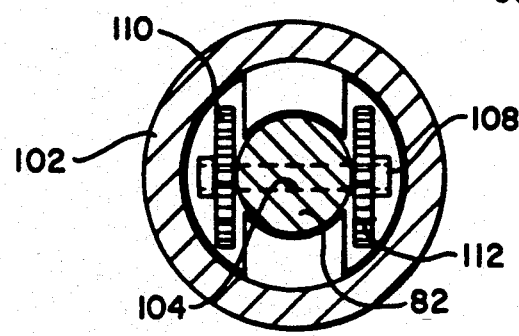
FIG. 5 is an end elevational, sectional view taken along the line 5—5 of FIG. 4.

As already noted, the outer end of the cylindrical axle 86 has a set of gear teeth 88 provided along the outer end (FIG. 4). A cylindrical mounting element 102, having an outer diameter that is substantially identical to that of the flat coil storage spindle 90, is also provided with an opening 104 within a centrally located partition 106 enabling press fit receipt onto the core 82. A pin 108 passes through a suitably dimensioned opening in the core 82 and has rotatably affixed to its outwardly extending end portions spur gears 110 and 112 (FIGS. 4 and 5). These gears have teeth which mesh with the gear teeth 88 on the end of axle 86 and the shaft 108 is so positioned as to enable meshed relationship of the gears to the teeth on the axle.

A further cylindrical axle 114 is received onto the outer end of the core 82 and has an outer diameter identical to that of the axle 86. A set of gear teeth 116 on the end of the axle is so formed as to be able to mesh with the spur gears 110 and 112, and the axle 114 is held into such meshing relationship by an end hub 118 received on the outer core end positively positioning the axle into gear engaging relationship and secured by means 120 to the core. It is instructive to note that rotation of the first described axle 86 produces a rotation of the further axle 114 in an opposite direction as a result of the coupling effected by the spur gears 110 and 112 which, as will be shown, is utilized to produce winding of the two flat coils by the apparatus in opposite directions.

As already referenced, there are two winding devices 42 and 44 for winding a respectively separate pair of flat coils 54, and since they can be identical in construction only the details of the winding device 42 will be given. The winding device is seen to include an elongated arm 122 having an opening 123 in its side of such dimensions as to permit fitting receipt onto the axle 86 and which arm is secured thereto in a unitary relation by a clamping member 124 secured to the arm by a threaded means 126 for example. More particularly, the arm 122 has the opening 123 placed within a space 128 existing between the outer end of the flat coil storage spindle 90 from the adjacent edge of the cylindrical mounting element 102 and clamped onto the axle 86 by member 124. When the arm is so assembled to the shaft assembly, first and second pulleys 130 and 132 at the outer end of the arm has circular guide grooves for directing the optical fiber 40 along a relatively stress free and direct path into the winding space 38 and along a different direction while being taken off the takeup spool 52, respectively.

It is also important to note, for a purpose that will become evident later, that the clamp ring 99 can be moved further forward on the axle to the position shown by the dotted lines and reset at that location by the pin 100 when the winding device 44 is removed from the shaft assembly. In this latter position, the outer end of the flat coil storage spindle 90 abuts against the adjacent surface of the mounting element 102 forming a continuous and smooth peripheral surface.

Figure 13:
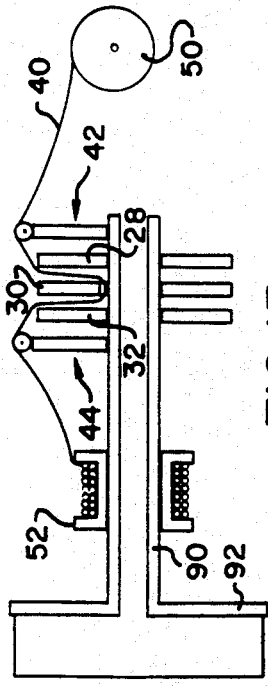

With reference now to FIGS. 9 through 17, the various steps of the method for winding a pair of coils by the use of the described apparatus will be given. In the usual situation, the winding device 42 which is the winding device closer to the supply spool 50 and the outer guide plate 28 immediately adjacent this winding device, remain mounted to the shaft assembly at all times (although guide plate 28 can slide along the shaft assembly) and it shall be assumed as an initial condition that these apparatus elements are so mounted (FIG. 9). As a first step, the predetermined length 48 of optical fiber 40 is taken off the supply spool and wound onto the temporary takeup spool 52 in a direction that will permit unwinding or removal from the spool on operation of the winding device 44. Next, the center plate 30 is assembled onto the shaft assembly with the fiber located within the enlarged space 81 at the center of the plate (FIGS. 10 and 11) following which the guide plate 32 is similarly assembled onto the shaft assembly 34 with the fiber being threaded upwardly through the winding space 38 (FIG. 12). As a final matter preceding actual winding, the winding device 44 is assembled onto the shaft assembly and the fiber is positioned on its two pulleys 130 and 132 (FIG. 13). Rotational power is applied to the winding devices and the two flat coils are formed in the winding spaces 36 and 38 as a result of the two winding devices moving in opposite directions.

Figures 6A, 6B:
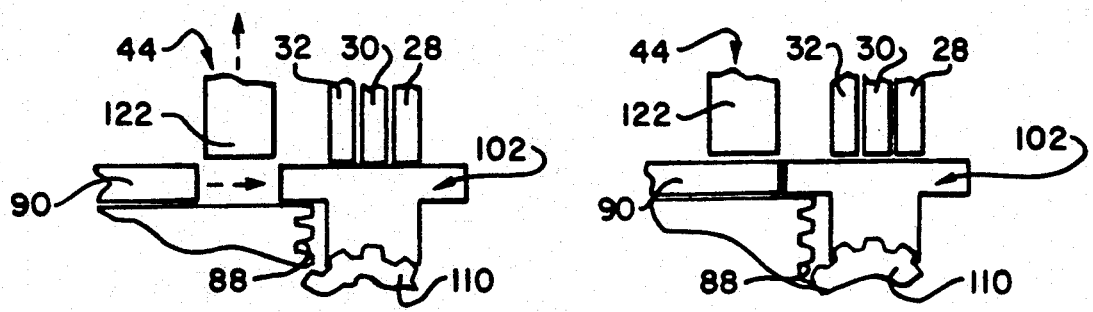
FIGS. 6A and 6B are detail elevational views showing adjustment of the shaft assembly to enable removal of flat coils to a storage position.
Figure 14:
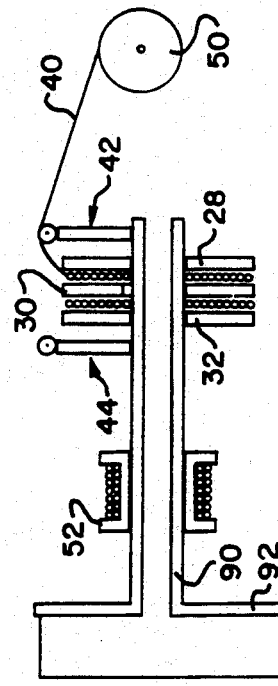
Figure 15:
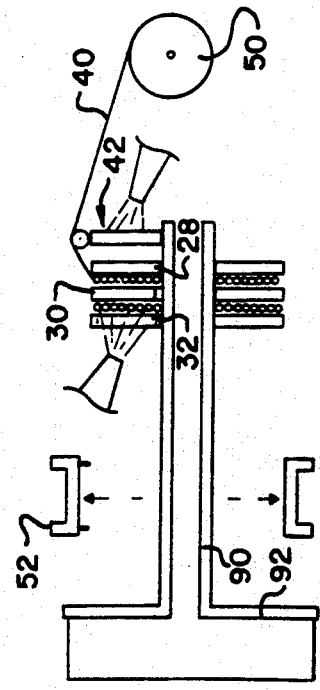
Figure 16:
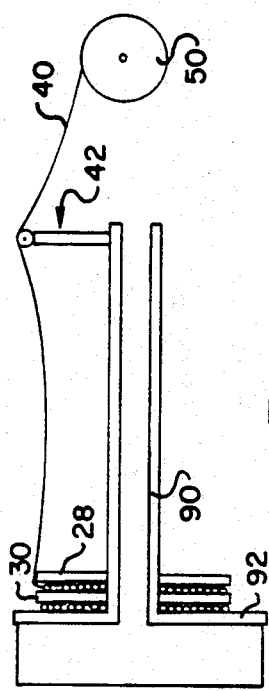

On completion of the winding of the two coils FIG. 14), the winding device 44 is removed from the shaft assembly and an adhesive is applied through openings 70 in the guide plates 28 and 32 (FIG. 15) onto the newly formed coils. At this time it is necessary to eliminate the space between the end of the spindle 90 and the element 102 which has been left by removal of the winding device 44 (FIG. 6A) and this is accomplished by merely sliding the spindle into abutment with element 102 (FIG. 6B). Following the application of adhesive to the one newly formed flat coil, guide plate 32 is then disassembled and the remaining parts of the coil winding are slid along the shaft assembly onto the storage spindle 90 adjacent the flange 92 (FIG. 16).

Figure 17:
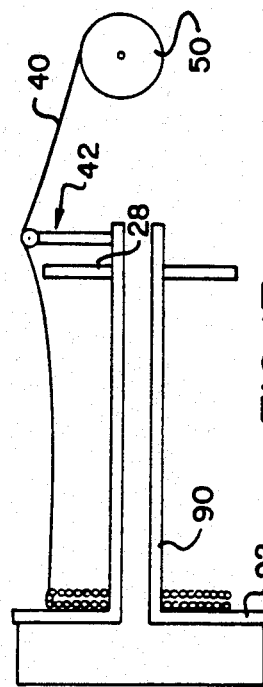

At this time the guide plate 28 is carefully disassembled from the shaft assembly leaving the two flat coils stacked in tandem against the flange 92 and guide plate 28 is slid back next to winding device 42 (FIG. 17). The process may be repeated as many times as desired by repeating the steps beginning with FIG. 9.

In accordance with the present invention there is provided a method and apparatus for winding flat coils (e.g., one filament thickness) from very fine filaments such as an optical fiber in such a manner so as not to damage or stress the filament while forming the coils. The coils are formed in pairs from a single continuous fiber with each of the so formed flat coils stored in a tandem side-by-side relation on a storage spindle.

Although the present invention has been described in connection with a preferred embodiment, it is to be understood that those skilled in the appertaining arts may effect modifications that are within the spirit of the invention described and also within the ambit of the appended claims.

What is claimed is:

1. Apparatus for simultaneously winding a pair of flat coils form a single unbroken filament on a supply spool, comprising:
   a shaft assembly;
   three platelike guide means each having a central opening removably received on the shaft assembly with the two outer guide means being spaced from the central guide means to form first and second winding spaces, the central guide means having a further opening closely adjacent the shaft assembly;
   first filament winding means mounted on the shaft assembly outwardly of and adjacent to one of the outer platelike means for winding a length of the filament into the first winding space; and
   second filament winding means mounted on the shaft assembly outwardly of and adjacent to the other outer platelike means for winding a further filament length into the second winding space; and means for moving the first and second winding means in opposite winding directions during winding of the flat coils including a rotatable axle mounted within the shaft assembly interconnected to directly drive the first winding means, and gear means meshingly connected with said axle to drive the second winding means oppositely to the first winding means.

2. Apparatus as in claim 1, in which the axle includes gear teeth on an end thereof which mesh with the gear means, and there is provided a further axle on which the second winding means is mounted having gear teeth interconnected with the gear means.

3. Apparatus as in claim 1, in which the shaft assembly further includes coaxial hollow spindle means received on the axle for receiving completed flat coils thereon.

4. Apparatus as in claim 3, in which there is further provided a takeup spool mounted on the hollow spindle means, said takeup spool receiving a predetermined length of filament sufficient to enable winding a single flat coil.

5. Apparatus as in claim 4, in which the takeup spool is removably mounted on the hollow spindle means.

6. Apparatus as in claim 1, in which the shaft assembly further includes a fixed positioned rodlike core.

7. Apparatus as in claim 6, in which the axle is hollow and slidingly received on the core.

* * * * *